United States Patent Office 3,095,415
Patented June 25, 1963

3,095,415
ANTHRAQUINONE DYESTUFFS CONTAINING A 2-CHLORO, 4-HYDROXY(LOWER)ALKYLAMINO, TRIAZINYLAMINO GROUP
Max Staeuble and Kurt Weber, Basel, Switzerland, assignors to Ciba Limited, Basel, Switzerland, a company
No Drawing. Filed June 5, 1961, Ser. No. 114,598
Claims priority, application Switzerland May 30, 1958
5 Claims. (Cl. 260—249)

This invention provides valuable new anthraquinone dyestuffs which correspond to the general formula (1) 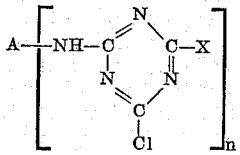

in which A represents an anthraquinone radical, and X represents a lower hydroxyalkylamino substituent or the $NH_2$-group, and n represents the whole number 1 or 2. Especially valuable are those of the formula

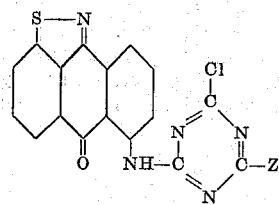

and of the formula

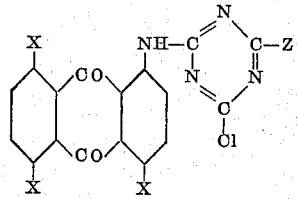

wherein one X is an acylamino group for example a benzoylamino group, the other X's are hydrogen atoms and Z represents a lower hydroxyalkylamino or the —$NH_2$-group.

The invention also provides a process for the manufacture of the anthraquinone dyestuffs of the above general formula, wherein an amino anthraquinone A—$NH_2$ more especially one of the formulae

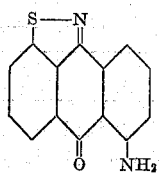

and

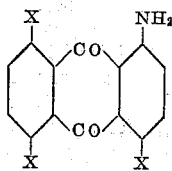

is condensed with a compound of the formula (2) 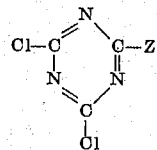

in which Z represents a hydroxyalkylamino group, the $NH_2$-group or a chlorine atom, and, in this latter case, one of the two remaining chlorine atoms is exchanged for a hydroxyalkylamino or the $NH_2$-group.

As aminoanthraquinones A—$NH_2$ suitable for the process of this invention there may be mentioned monoamines and also diamines, for example, 1-aminoanthraquinone and simple substitution products thereof, for example, 1-amino-4-methoxyanthraquinone or 1-amino-4-, -5-, or 8-acylaminoanthraquinones, especially -benzoylaminoanthraquinones. The latter compounds may be substituted in the benzoyl radical, for example, by a halogen atom or a methoxy, alkyl, trifluormethyl, sulfonamido or sulfone group. There may also be mentioned 1:4-diaminoanthraquinone and substitution products thereof substituted in the 2-position, for example, 1:5- or 1:8-diaminoanthraquinone or 1:5-diamino-4:8-dihydroxyanthraquinone. The radical A in the above Formula 1 also includes anthraquinone radicals which contain a fused on carbocyclic or heterocyclic ring, for example 4-aminoanthraquinone-2:1(N)-acridone, 5-amino-1:9-isothiazole-anthrone, 4- or 5-aminoanthrapyrimidine, amino-acedianthrones, 4- or 5-amino-1':1-dianthrimide-carbazole, 4- or 5-amino-5'-benzoyl-amino-dianthrimide-carbazole, 4-amino-4'-benzoyl-amino-dianthrimide-carbazole, 4-amino-anthrapyridones, aminodibenzanthrone, aminoisodibenzanthrone, aminoanthanthrone, aminobenzanthrone, aminoflavanthrone and also the compound of the formula (3) 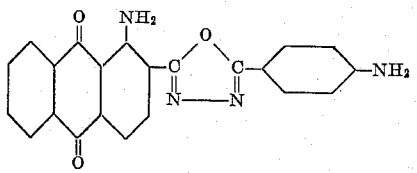

As compounds of the Formula 2 there are advantageously used those in which Z represents a chlorine atom or a mono- or di-β-hydroxyethylamino group.

The reaction of the amino anthraquinones A—$NH_2$ with the triazine of the Formula 2 is advantageously carried out in an inert organic solvent, for example nitrobenzene, chlorobenzene or ortho-dichlorobenzene, at a raised temperature. The relative molecular proportions of the components are advantageously so chosen that one molecular proportion of a compound of the Formula 2 is present for each amino group of the anthraquinone compound.

When a triazine of the Formula 2 is used as starting material, in which Z represents a chlorine atom, that is to say cyanuric chloride, there is first obtained a dichlorotriazine dyestuff in which one chlorine atom must be replaced by a hydroxyalkylamino group, for example, by heating with β-hydroxyethylamine, for instance in an inert diluent. It is not necessary to isolate the primary condensation product, so that both reactions may be carried out in the same vessel. In the case of dyestuffs containing a hydroxyalkyl group, the hydroxyl group may be subsequently sulfated by reaction, for example, with concentrated sulfuric acid.

The dyestuffs so obtained may be isolated from the medium in which they are produced and worked up into useful dry dyestuff preparations, notwithstanding the presence of an exchangeable halogen atom. The dyestuffs are advantageously isolated by filtration. The filtered dyestuffs may be dried, if desired, after the addition of a neutral or weakly alkaline extender. The drying is advantageously carried out at not too high a temperature, if desired, under reduced pressure.

The new dyestuffs are suitable for dyeing a very wide variety of materials, and especially for dyeing or printing textile materials of natural or regenerated cellulose by the usual vat dyeing or printing processes. As the reactivity of the halogen atom in the triazine ring may vary somewhat from compound to compound, it is of advantage to choose the dyeing conditions to suit the dyestuff used, especially the concentration of the alkali or reducing agent, and also the duration and temperature during the dyeing or steaming. The most favourable conditions can easily be determined by preliminary experiments.

The dyeings and prints produced with the new dyestuffs are distinguished by their excellent fastness to light and properties of wet fastness.

In contradistinction to conventional vat dyestuffs, it is generally not possible to remove the dyestuffs of this invention from the fiber to any substantial extent by means of hot dimethyl-formamide, so that the dyestuffs are probably chemically bound to the fiber.

The dyeings produced with the dyestuffs of this invention are therefore also fast to dry cleaning and migration. The dyed fabrics can therefore be coated with artificial resins, for example, polyvinyl chloride, without the dyestuff migrating into the synthetic resin. This is especially important in the manufacture of artificial leather.

The dyestuffs of the present invention may also be used for dyeing polyester fibers such as the polyethylene terephthalate fibers. For this purpose they are commonly used in form of fine dispersions obtained by grinding them together with dispersing agents, such as soap, and in combination with usual wetting agents and, if necessary, swelling agents, such as phenol, hydroxydiphenyl and so on. The dyestuffs of the present invention are particularly suitable for dyeing by the so-called Thermosol process which comprises impregnating the fabric to be dyed with an aqueous dispersion of the dyestuff containing advantageously a thickener, especially sodium alginate, preferably at a temperature not exceeding 60° C. and then squeezing the fabric as usual. It is of advantage to squeeze the fabric so that it retains 50–100% of its weight of dyeing liquor.

To bring about fixation of the dyestuff, the impregnated fabric is heated to a temperature above 100° C. e.g. between 140 and 240° C., advantageously after being first dried, e.g. in a current of warm air.

The aforementioned Thermosol process is of particular interest for dyeing mixed fabrics from polyester fibers and cellulose fibers, especially cotton. In this case, the padded fabric, after the heat treatment, can be treated with an aqueous alkaline solution of a reducing agent commonly used in vat dyeing, as for example sodium hydrosulfite or thiourea dioxide so that the dyestuff is fixed also on the cotton. However, it is advisable to add to the padding liquor, in addition to the dyestuff to be used according to this invention, a dyestuff commonly used for producing fast dyeings on cotton, for example a reactive dyestuff or in particular one of the usual commercial vat dyestuffs. When reactive dyes are used, it is of advantage to add to the padding liquor an acid-binding agent, for example a carbonate, phosphate, borate, or perborate of an alkali metal. When vat dyestuffs are used it is necessary to after-treat the padded fabric (after the heat treatment) with an aqueous alkaline solution of one of the reducing agents commonly used in vat dyeing.

The dyeings obtained according to the present process are advantageously subjected to an after-treatment consisting, for example, in heating them with an aqueous solution of soap or a non-ionic detergent.

Under the present process, the dyestuffs can be applied to the fabrics by printing instead of by impregnating. For this purpose there is used, e.g. a printing paste containing in addition to the usual auxiliary substances, such as wetting and thickening agents, the finely dispersed dyestuff, if desired in admixture with one of the afore- mentioned cotton dyestuffs, if desired in the presence of urea and/or an acid-binding agent.

There are obtained by the present process powerful dyeings and prints having excellent wet fastness properties and in particular outstanding fastness to light and sublimation. It is also noteworthy that they have a good fastness to crocking and dry cleaning.

This is a continuation in part of our application Serial No. 815,266, filed May 25, 1959 (now U.S. Patent No. 3,022,304).

The following examples illustrate the invention, the parts and percentages being by weight:

EXAMPLE 1

A mixture of 45 parts of 1-aminoanthraquinone and 74 parts of cyanuric chloride is heated in 450 parts of nitrobenzene for 4 hours at 115 to 120° C. The reaction mixture is allowed to cool and the precipitated condensation product is filtered off.

18.5 parts of the resulting 4:6-dichloro-2-[anthraquinoyl-(1)-amino]1:3:5-triazine are stirred in 180 parts of nitrobenzene for 30 minutes at 75 to 80° C. 10.5 parts of diethanolamine in 100 parts of nitrobenzene are then slowly added dropwise in the course of 2 hours; the product precipitates in the form of small, handsome, yellow needles. The whole is stirred for 2 hours at 75 to 80° C. and allowed to cool. The product is filtered off and washed successively with benzene, alcohol and water. When dry, the dyestuff forms a yellow crystalline powder and corresponds to the formula

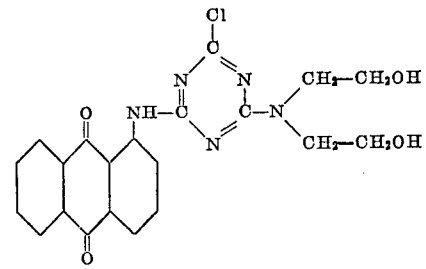

It may be used according to the following procedure:

14 parts of the dyestuff are finely ground in a ball mill with 126 parts of a neutral solution of 125 parts of dinaphthylmethanedisulfonic acid in 1000 parts of water.

A padding liquor of the following composition is prepared:

| | |
|---|---|
| Parts of the dyestuff paste described above | 200 |
| Parts of sodium alginate 1:100 | 300 |
| Parts of water | 500 |
| Parts | 1000 |

A polyester fabric is padded in a foulard with the described treatment bath (two passages) so that its weight increases 50–60%, and then dried at 60° C. The fabric is then subjected to a heat treatment for 15 to 120 seconds at a temperature of 200 to 220° C. The material is then soaped at the boil for 30 minutes with a solution of 5 g. of soap per liter of water and finished as usual (rinsing, drying). There is obtained a yellow dyeing having excellent properties of fastness, especially to light and sublimation.

EXAMPLE 2

18.5 parts of the 4:6-dichloro-2-[anthraquinoyl-(1)-amino]-1:3:5-triazine obtained as described in the first paragraph of Example 1 are condensed with 6.1 parts of monoethanol-amine as described in Example 1. The product, which is obtained in the form of short, yellow needles, is isolated as described in Example 1; when dry, it forms a yellow crystalline powder. The dyestuff corresponds to the formula

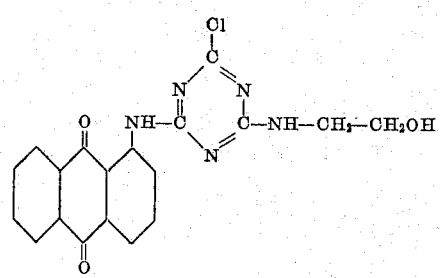

The identical dyestuff can also be prepared by condensing 15.7 parts of 2-(β-hydroxyethylamino)-4:6-dichloro-1:3:5-triazine with 11.2 parts of 1-aminoanthraquinone in 120 parts of nitrobenzene at 115 to 120° C.

Dyeings and prints produced on cotton or regenerated cellulose resemble those obtained with the dyestuff according to Example 1.

When the monoethanolamine is replaced in this example by an equimolecular amount of cyclohexylamine or aniline, yellow dyestuffs having similar properties result.

EXAMPLE 3

18.5 parts of the 4:6-dichloro-2-[anthraquinoyl-(1)-amino]-1:3:5-triazine obtained as described in the first paragraph of Example 1 are stirred in 200 parts of nitrobenzene for 30 minutes at 95 to 100° C. A moderate current of ammonia is then introduced for 1½ hours at 95 to 100° C., whereupon the product separates out in the form of small yellow needles. The reaction mixture is allowed to cool and then filtered, and the filter residue is washed successively with benzene, alcohol and water. The dried product forms a yellow crystalline powder and corresponds to the formula

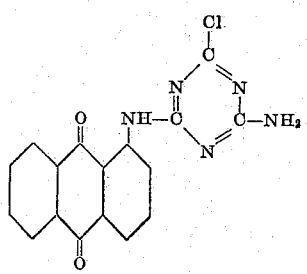

When this dyestuff is dyed by the method described in Example 1, the resulting dyeings have similar tints and properties to those obtained with the dyestuff according to Example 1.

On cotton and regenerated cellulose clear, yellow prints of good fastness are obtained by the method described in Example 16.

EXAMPLE 4

18.5 parts of the 4:6-dichloro-2-[anthraquinoyl-(1)-amino]-1:3:5-triazine obtained as described in the first paragraph of Example 1 are stirred in 200 parts of nitrobenzene for 30 minutes at 95 to 100° C. in the presence of 20 parts of N:N-diethylaniline. A solution of 13 parts of 3-aminodiethanol-sulfonamide in 260 parts of nitrobenzene is then slowly added dropwise in the course of 2 hours. In the course of a further 2 hours the whole is heated to 140 to 145° C. and kept at the same temperature for 1 hour, and then allowed to cool. The dyestuff, which separates out in the form of small yellow needles, is filtered off and washed successively with benzene, alcohol and water. When dry, it forms a yellow crystalline powder and corresponds to the formula

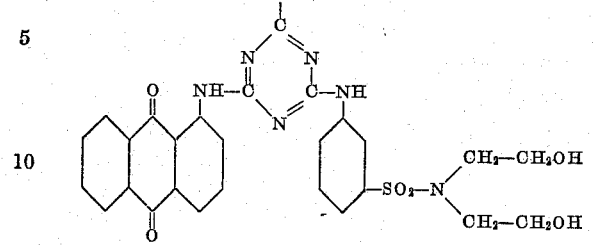

When used for dyeing by the method described in Example 1, it produces dyeings which correspond as to tint and fastness to those obtained with the dyestuff according to Example 1. The same is true of vat prints produced with it.

EXAMPLE 5

34.2 parts of 1-amino-4-benzoylaminoanthraquinone are heated with 37 parts of cyanuric chloride in 450 parts of nitrobenzene for 4 hours at 115 to 120° C. The reaction mixture is allowed to cool, and the precipitated condensation product is filtered off.

14.7 parts of the resulting 4:6-dichloro-2-[(4)-benzoylaminoanthraquinoyl-(1)-amino]1:3:5-triazine are stirred for 30 minutes at 75 to 80° C. in 150 parts of nitrobenzene. In the course of 2 hours at 75 to 80° C. 6.3 parts of diethanolamine in 100 parts of nitrobenzene are then slowly added dropwise, and the whole is stirred on for 2 hours at the same temperature. During the dropwise addition, the product settles out in the form of fine, small, red needles. The whole is allowed to cool and filtered, and the filter residue is washed successively with benzene, alcohol and warm water, and finally dried. The dyestuff forms a bluish red powder and corresponds to the formula

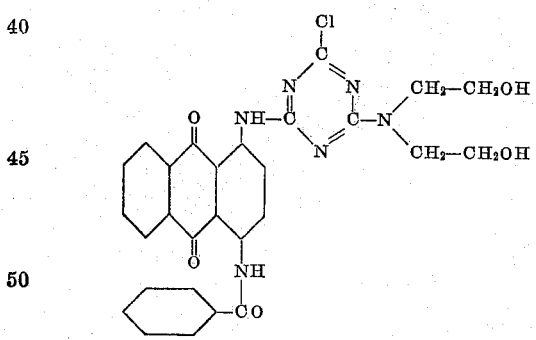

On cotton and regenerated cellulose it produces from an alkaline hydrosulfite vat red dyeings of good fastness properties, more especially excellent fastness to light.

Especially clear, red vat prints, having good properties of fastness, are obtained on staple fibers of regenerated cellulose.

On polyethylene terephthalate fibers it gives fast red tints according to the method indicated in Example 1. The dyestuff of the formula

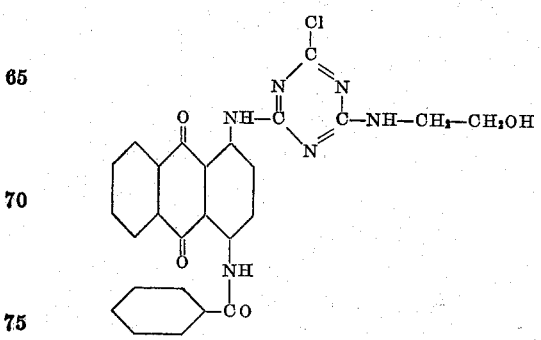

prepared in an analogous manner yields similar dyeings and vat prints on cotton and regenerated cellulose.

EXAMPLE 6

14.7 parts of the 4:6-dichloro-2[(4)-benzoylaminoanthraquinoyl-(1)-amino]-1:3:5-triazine obtained as described in the first paragraph of Example 10 are condensed in 200 parts of nitrobenzene with ammonia as described in Example 3. The dyestuff, which precipitates in the form of short red needles, forms when dry a bluish red crystalline powder and corresponds to the formula

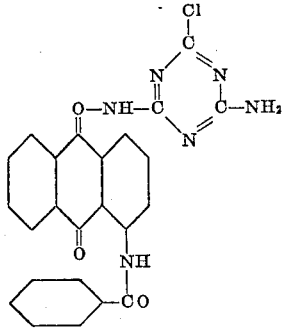

On cotton and regenerated cellulose it produces from an alkaline hydrosulfite vat dyeings having properties similar to those obtained with the dyestuff described in Example 5.

EXAMPLE 7

14.7 parts of the 4,6-dichloro-2-[(4)-benzoylaminoanthraquinonyl-(1)-amino]-1,3,5-triazine obtained according to the first paragraph of Example 5, are condensed in 150 parts of nitrobenzene containing 15 parts of diethylaniline with 7.8 parts of 3-aminodiethanol-sulfonamide in the manner described in Example 4. The dyestuff which is obtained in small red needles is dried and then is in the form of a bluish-red crystal powder. It corresponds to the formula

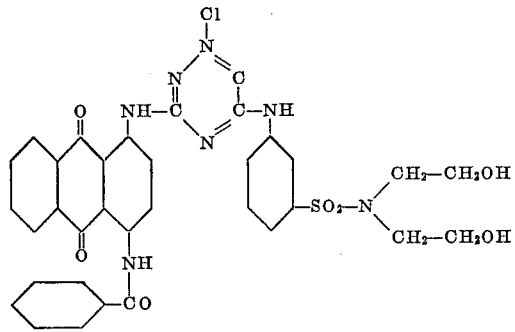

Dyeings produced with this dyestuff on polyester fabrics by the method described in Example 1 correspond in shade and fastness properties to those obtained with the dyestuffs according to Example 5.

EXAMPLE 8

7.0 parts of 1-amino-5-benzoylaminoanthraquinone are dissolved with heat in 150 parts of nitrobenzene and then treated at 140° C. with a solution of 6.0 parts of cyanuric chloride in 30 parts of nitrobenzene. After a short time the monocondensation product of the formula

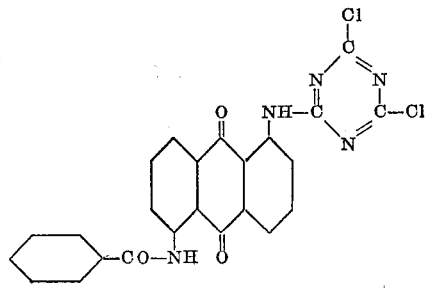

begins to crystallize out in the form of small, yellow crystals. The reaction mixture is stirred for 5 hours at 140 to 145° C., allowed to cool, and the product is suctioned off and washed with a small amount of nitrobenzene. While the filter residue is still moist with nitrobenzene it is suspended in 100 parts of dry nitrobenzene and heated on a water bath at 90 to 100 C°. 2.5 parts of monoethanolamine are then stirred in dropwise in the course of 1 hour. The whole is stirred for 4 hours at 95 to 100° C. and then allowed to cool. The dyestuff is filtered off, washed successively with nitrobenzene, methanol and water, and then dried at 70 to 80° C. under reduced pressure.

When dry, this new dyestuff of the formula

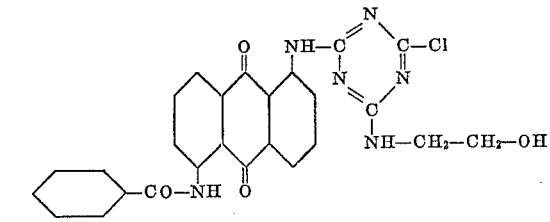

forms an orange-yellow powder. On regenerated cellulose it produces by the method described in Example 16 clear orange-yellow prints having very good properties of fastness.

According to the method given in Example 1 polyethyleneterephthalate fabrics are dyed in fast orange tints.

When 4.2 parts of diethanolamide are used in this example instead of 2.5 parts of monoethanolamine, a dyestuff is obtained which possesses similar properties.

Similar dyestuffs are obtained by using as starting material 1-amino-5-acetylaminoanthraquinone or 1-amino-5-butyrylaminoanthraquinone.

EXAMPLE 9

34 parts of 4-aminoanthraquinone-2:1(N)-acridone are heated with 37 parts of cyanuric chloride in 800 parts of nitrobenzene for 3 hours at 140 to 145° C. The reaction mixture is then allowed to cool, and the precipitated condensation product is filtered off.

14.7 parts of the resulting condensation product from 1 molecular proportion of 4-amino-2:1(N)-anthraquinone acridone and 1 molecular proportion of cyanuric chloride of the formula

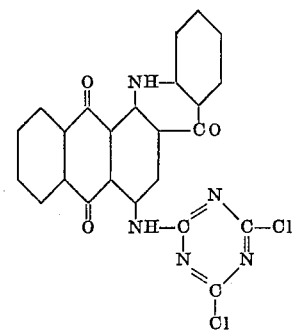

are condensed with ammonia in 200 parts of nitrobenzene for 3 hours at 95 to 100° C. as described in Example 3.

The dry dyestuff forms a blue powder and corresponds to the formula

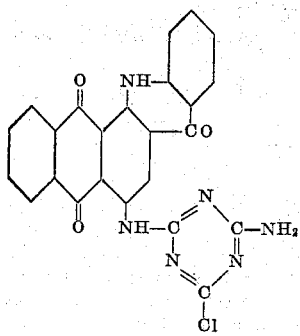

When used for dyeing cotton or regenerated cellulose by the method according to Example 5, it yields clear blue tints having good fastness properties.

EXAMPLE 10

14.7 parts of the condensation product, obtained as described in the first paragraph of Example 14, from 1 molecular proportion each of 4-amino-2:1(N)-anthraquinone acridone and cyanuric chloride are condensed in 150 parts of nitrobenzene with 6.3 parts of diethanolamine as described in Example 1. When dry, the dyestuff forms a greenish blue crystalline powder and corresponds to the formula

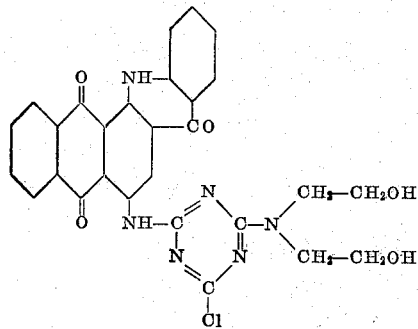

On cotton and regenerated cellulose it produces from an alkaline hydrosulfite vat blue dyeings having good properties of fastness.

EXAMPLE 11

50.4 parts of aminoisothiazolanthrone are stirred with 74 parts of cyanuric chloride in 500 parts of nitrobenzene at 140–145° C. for 3 hours. After cooling, the precipitated condensation product is filtered off. 20 parts of this product of the formula

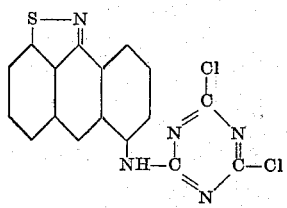

are condensed with diethanol amine in the manner described in Example 4.

The dyestuff thus obtained corresponds to the formula

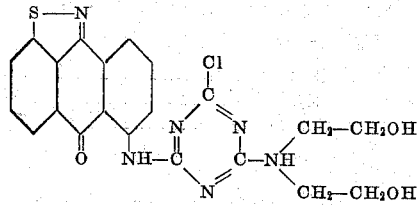

and yields on polyester fabrics by the procedure described in Example 1 yellow dyeings having excellent fastness properties.

EXAMPLE 12

When the dichlorotriazinylaminoisothiazolanthrone of the first formula indicated in Example 11 is condensed according to Example 2 with monoethanolamine, there is obtained the dyestuff of the formula

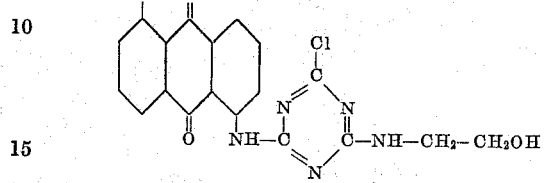

which also produces very fast dyeings on polyester fabrics.

EXAMPLE 13

14 parts of the dyestuff of the formula

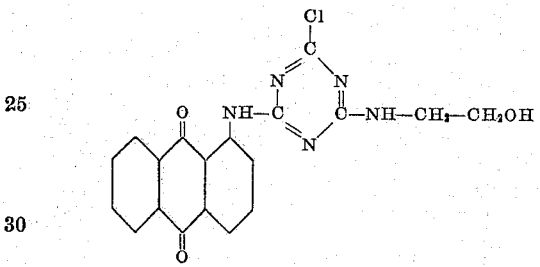

and 14 parts of the dyestuff of the formula

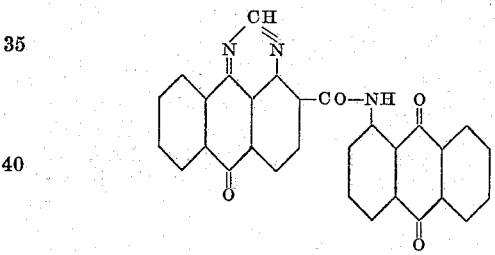

are finely ground in a ball mill with 28 parts of dinaphthylmethanedisulfonic acid and 84 parts of water. A padding liquor of the following composition is prepared:

Parts of the dyestuff paste described above _____ 200
Parts of sodium alginate 1:100 _____ 300
Parts of water _____ 500

Parts _____ 1000

A mixed fabric of polyester and cotton fibers is padded in a foulard with the treatment bath described (two passages) so that its weight increases 50–60%, and then dried at 60° C. The fabric is then subjected to a heat treatment at 200–220° C. for 15–120 seconds, and then treated for 20 minutes at 50° C. in a bath containing per liter 4 g. of sodium hydrosulfite, 6 g. of sodium hydroxide solution of 36° Bé. and 30 g. of sodium chloride. It is then oxidized, rinsed, and finished in the manner described in Example 1. There is obtained a yellow dyeing having excellent properties of fastness.

EXAMPLE 14

1 part of the dyestuff of the formula

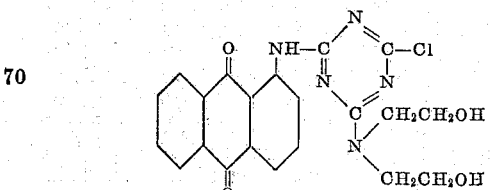

in the form of an aqueous paste is ground in a ball mill with about 1 part of dried sulfite cellulose waste liquor to form a fine paste having a dyestuff content of about 10%.

100 parts of polyethyleneterephthalate fiber material are purified for half an hour in a bath containing per 1000 parts of water 1 to 2 parts of the sodium salt of N-benzyl-$\mu$-heptadecyl-benzimidazole-disulfonic acid and 1 part of concentrated aqueous ammonia solution. The fiber material is then introduced into a dyebath of 3000 parts of water in which there are dispersed the dyestuff paste obtained according to the first paragraph of this example and 4 parts of the sodium salt of N-benzyl-$\mu$-heptadecyl-benzimidazole-disulfonic acid. The whole is heated to 120° C. in a pressure vessel, and maintained at that temperature for about half an hour. After that, the material is rinsed well and, if necessary, washed for half an hour at 60-80° C. with a solution containing in 1000 parts of water 1 part of the sodium salt of N-benzyl-$\mu$-heptadecyl-benzimidazole-disulfonic acid. There is obtained a yellow dyeing having excellent fastness to sublimation and light.

EXAMPLE 15

14 parts of the dyestuff obtained as described in Example 1 are finely ground in a ball mill with 126 parts of a neutral solution of 125 parts of dinaphthyl-methane-disulfonic acid in 1000 parts of water. 10 parts of the resulting paste are suspended in 100 parts of water. A cotton fabric is impregnated with this suspension to a weight increase of 75% and then dried. The fabric is then impregnated with a solution containing per liter 16 grams of sodium hydroxide, 10 to 300 grams of sodium chloride and 30 grams of Rongalite (trade name for sodium sulfoxylate formaldehyde), squeezed to a weight increase of 75%, the dyeing is steamed for 1 to 9 minutes at 100 to 101° C., thoroughly rinsed in cold water, treated with a sodium bicarbonate solution of 0.5% strength, rinsed, soaped for 20 minutes in a boiling 0.3% solution of a non-ionic detergent, rinsed and dried. A clear yellow dyeing of good fastness properties is obtained.

EXAMPLE 16

28 parts of the dyestuff obtained as described in Example 3 are ground in a ball mill with 112 parts of a neutral solution of 125 parts of dinaphthyl-methanedisulfonic acid in 1000 parts of water.

A printing paste is prepared from

| | |
|---|---|
| Parts of the dyestuff paste describe above | 100 |
| Parts of water | 300 |
| Parts of thickening KD | 600 |
| Parts | 1000 |

Preparation of Thickening KD (a) 20 parts of locust bean flour are strewn into 450 parts of water.

(b) 15 parts of wheat starch are pasted with 20 parts of water and diluted with 495 parts of boiling water.

(a) and (b) are combined, boiled for 20 minutes and stirred until cold. 1 part by volume of aqueous formaldehyde solution of 30% strength is added as preservative.

The printing paste is printed on a fabric of cotton or staple fibers of regenerated cellulose on a roller printing machine. The fabric is dried, impregnated with a solution containing per liter 24 grams of sodium hydroxide, 70 grams of sodium hydrosulfite, 50 grams of sodium sulfate and 20 grams of borax, squeezed to a weight increase of 70% and fixed for a 24 seconds at 120° C. in a Monforts reactor, thoroughly rinsed in cold water, reoxidized at 40° C. in a solution containing per liter 5 parts by volume of hydrogen peroxide of 30% strength and 3 parts by volume of acetic acid of 40% strength, rinsed, soaped at the boil for 15 minutes, rinsed and dried.

A clear, yellow print of excellent fastness properties results.

What is claimed is:

1. Anthraquinone vat dyestuff of the formula

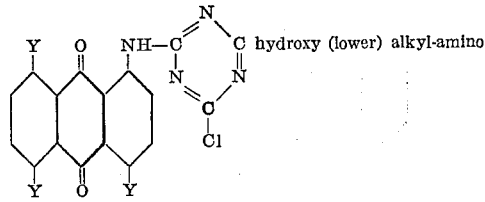

in which Y is a member selected from the group consisting of benzoylamino and H, the molecule containing at most one benzoylamino group.

2. The dyestuff of the formula

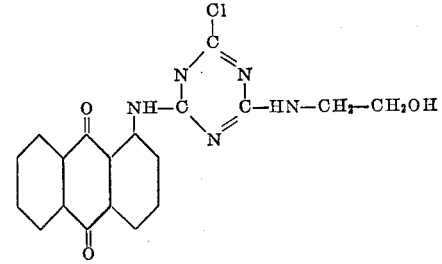

3. The dyestuff of the formula

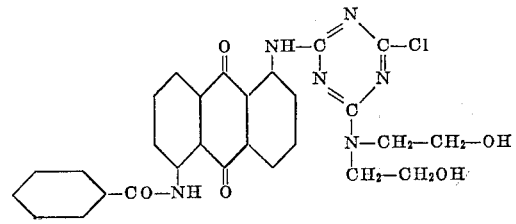

4. The dyestuff of the formula

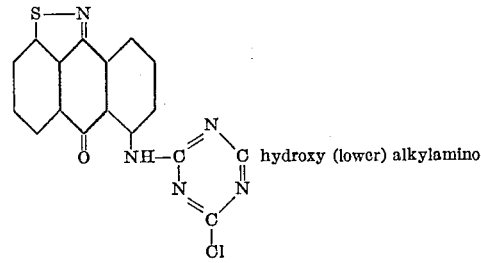

5. The dyestuff of the formula

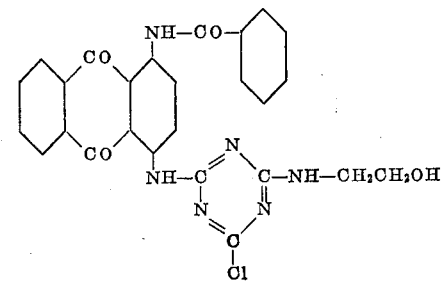

References Cited in the file of this patent

UNITED STATES PATENTS

| 1,437,783 | Steinbuch et al. | Dec. 5, 1922 |
| 2,742,466 | Randall et al. | Apr. 17, 1956 |
| 2,892,670 | Alsberg et al. | June 30, 1959 |

FOREIGN PATENTS

| 802,935 | Great Britain | Oct. 15, 1958 |
| 91,206 | Norway | Mar. 17, 1958 |